United States Patent [19]

Milbourn

[11] Patent Number: 4,769,977
[45] Date of Patent: Sep. 13, 1988

[54] BRUSH CUTTER

[76] Inventor: David E. Milbourn, Rte. 3, Box 696D, Hoquiam, Wash. 98550

[21] Appl. No.: 835,900

[22] Filed: Mar. 4, 1986

[51] Int. Cl.[4] ............................................. A01D 34/86
[52] U.S. Cl. ...................................... 56/15.2; 56/255; 144/34 R
[58] Field of Search ............... 56/15.2, 15.1, 15.3, 56/15.5, 400.04, 400.05, 10.7; 144/34 R, 34 E, 34 F; 83/928; 37/103, 117.5

[56] References Cited

U.S. PATENT DOCUMENTS

| | | | |
|---|---|---|---|
| 2,815,048 | 12/1957 | Davis | 143/32 |
| 2,927,706 | 3/1960 | Mork | 214/138 |
| 3,061,996 | 11/1962 | Ripps | 56/15.2 |
| 3,087,296 | 4/1963 | Cowles | 56/25.4 |
| 3,253,716 | 5/1966 | Stratton | 212/35 |
| 3,343,575 | 9/1967 | Trout | 144/34 |
| 3,494,389 | 2/1970 | Thibodeau | 143/32 |
| 3,575,222 | 4/1971 | Tucck | 144/34 R |
| 3,624,698 | 11/1971 | Storm | 56/25.4 |
| 3,897,678 | 8/1975 | Zurek et al. | 56/17.5 |
| 3,915,209 | 10/1975 | Denis | 144/34 |
| 4,121,777 | 10/1978 | Kolstad et al. | 144/34 R |
| 4,281,693 | 8/1981 | Moulson | 144/34 |
| 4,365,926 | 12/1982 | Brown | 414/685 |
| 4,393,607 | 7/1983 | Hirosawa | 37/103 |
| 4,446,897 | 5/1984 | Kurelek | 144/34 |
| 4,502,269 | 3/1985 | Cartuer | 56/15.2 |
| 4,509,315 | 4/1985 | Giguere | 56/10.7 |

*Primary Examiner*—John Weiss
*Attorney, Agent, or Firm*—Joan H. Pauly

[57] ABSTRACT

Three booms (20,30,50) form an articulated boom structure that is mounted on a pivotable base (10). The booms (20,30,50) are extendible into a position in which they extend one from another and are generally parallel to each other. The booms (20,30,50) may be folded into a position in which a workhead (74) attached to the outer boom (50) is positioned to work in the area on the ground near the base (10). The booms (20,30,50) fold into a Z-shaped configuration and may be pivoted to move the workhead (74) in a vertical line reaching to a height of about 40 feet. A rotary cutter (90) is carried by the workhead (74). Opposing jaws (84,86) are carried by the workhead (74) and third boom (50), respectively, and function, when the workhead (74) is pivoted, to grasp debris or to perform a digging operation. The jaw (84) may also be used as a rake. A shroud (82) on workhead (74) prevents debris from flying away from cutter (90) in unpredictable directions.

18 Claims, 4 Drawing Sheets

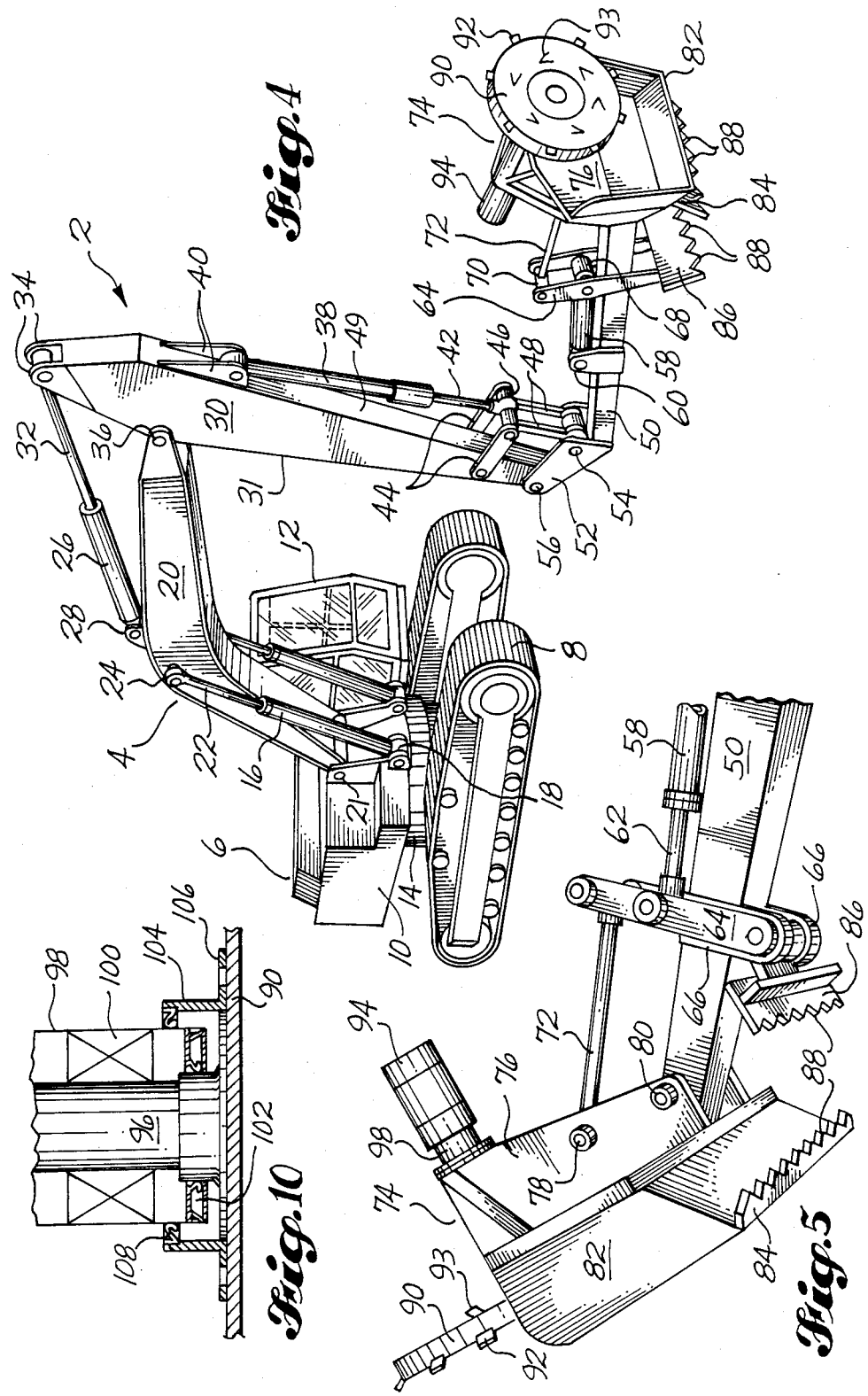

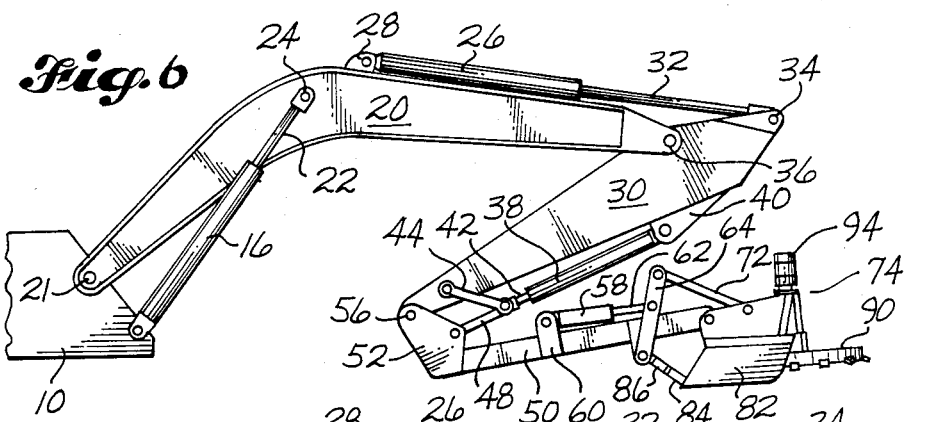
Fig. 6
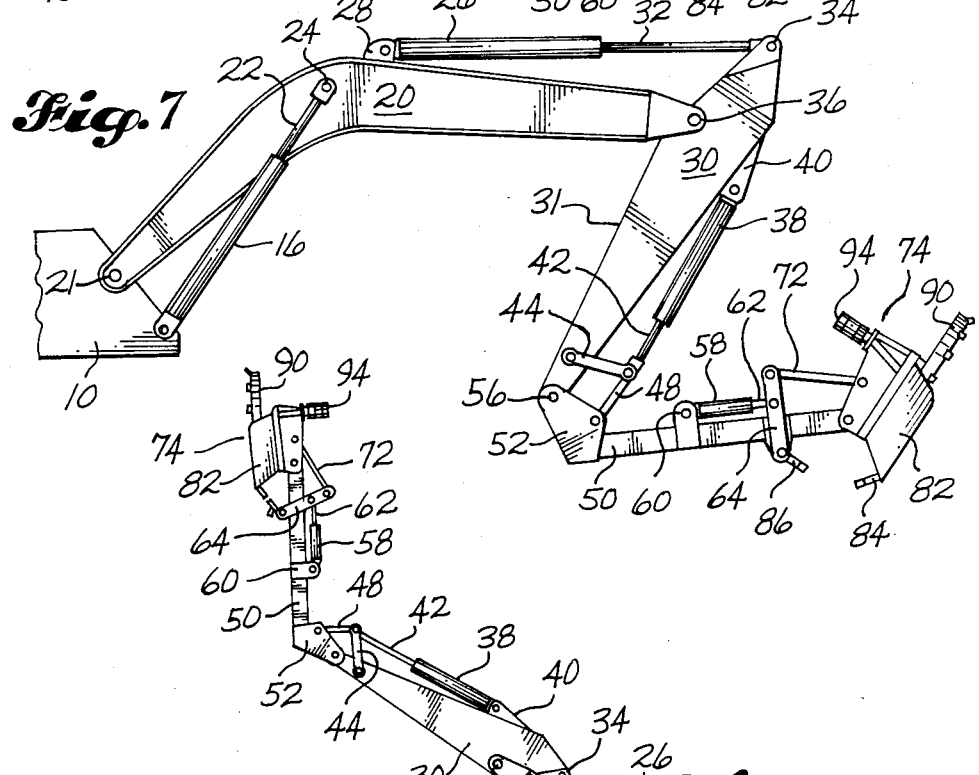
Fig. 7
Fig. 8
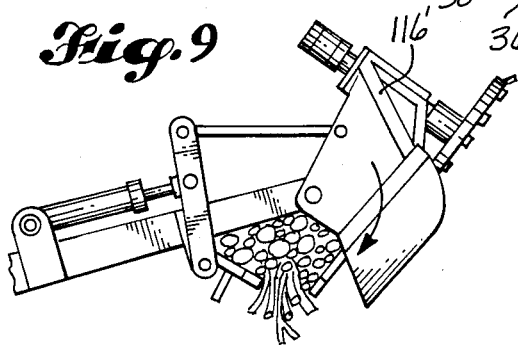
Fig. 9
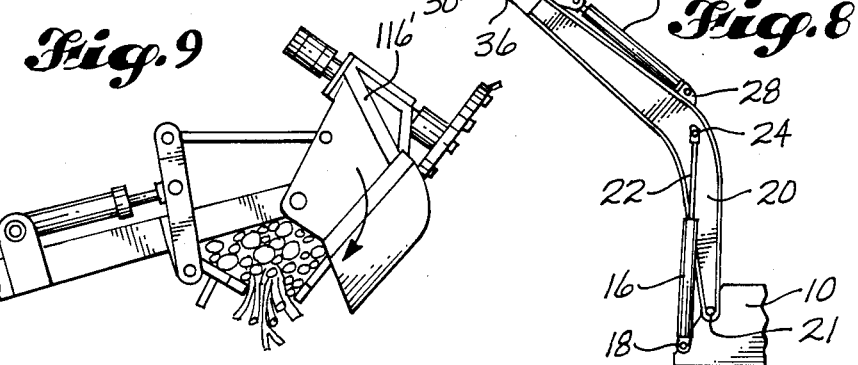

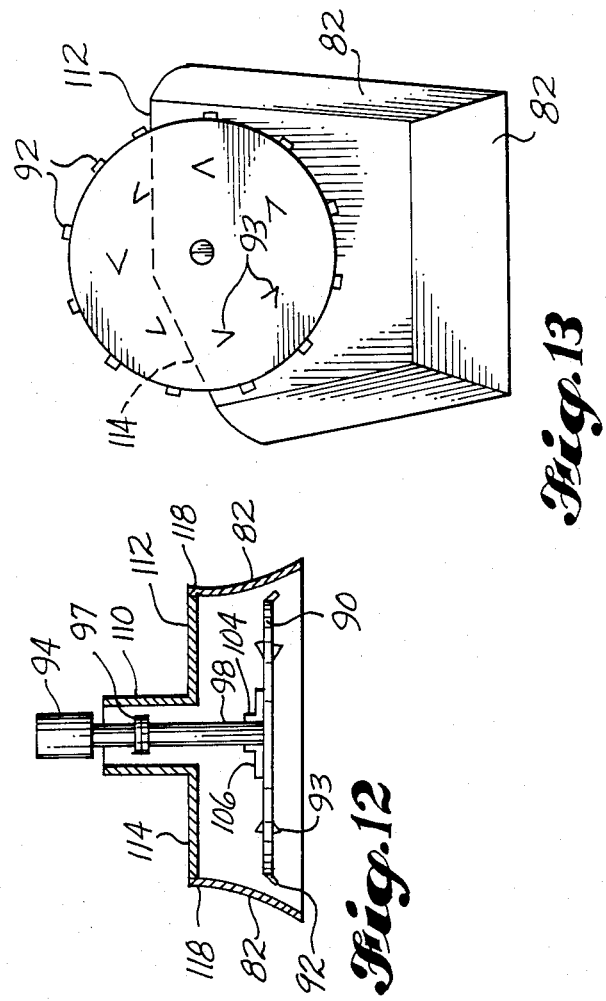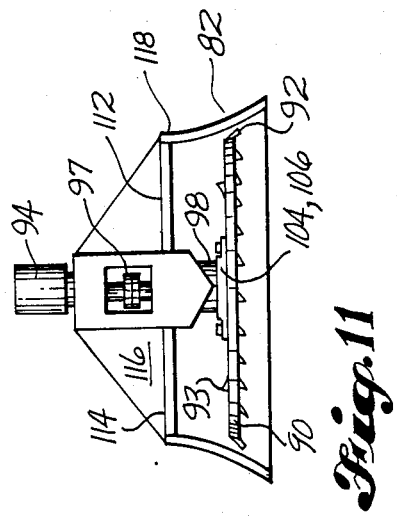

BRUSH CUTTER

DESCRIPTION

1. Technical Field

This invention relates to brush cutters and, more particularly, to a brush cutter having an articulated boom that can reach vertical heights of about 40 feet and ground locations ranging from close to a vehicle on which the boom is mounted to about 42 feet away from the vehicle, and a workhead that can move vertically along a tree to trim the branches thereof and that performs cutting, gathering, raking, and digging functions.

2. Background Art

There are many situations in which brush and other plant growth needs to be cut away or kept under control in relatively remote areas. Such situations include creating and maintaining rights-of-way for power lines, maintaining areas along roads, building roads, and keeping drainage ditches free of obstructions. Brush cutters mounted on various types of vehicles have been used to control and clear vegetation in remote locations. A major limitation of known brush cutters is that they have limited reach and maneuverability, and thus, the vehicle must be moved frequently in order to carry out the cutting or clearing operation. Known brush cutters generally are not capable of cutting brush close to the vehicle carrying the cutter, have a limited reach both horizontally and vertically away from the vehicle, and are not capable of moving in a straight vertical line to trim trees and the like. In addition, the workheads of known brush cutters are generally limited to a cutting function and cannot perform gathering, raking, or digging functions. Thus, separate mechanisms must be provided to perform these functions or the workhead must be changed during an operation. Separate mechanisms add to the overall cost of the equipment, and changing workheads creates costly delays in the operation.

Hydraulically operated brush cutters are disclosed in U.S. Pat. Nos. 2,815,048, granted Dec. 3, 1957, to G. Davis; 3,087,296, granted Apr. 30, 1963, to J. T. Cowles; 3,343,575, granted Sept. 26, 1967, to T. E. Trout; 3,624,698, grated Nov. 30, 1971, to N. Storm; 3,915,209, granted Oct. 28, 1975, to B. Denis; and 4,509,315, granted Apr. 9, 1985, to N. Giguere. The brush cutting apparatus disclosed in each of these patents includes an articulated boom mechanism. Storm discloses a brush-mowing attachment for tractors that has a three-arm boom with an inner arm that pivots about a vertical axis and two outer arms that pivot about horizontal axes. The cutters disclosed by Cowles, Trout, Storm, Denis, and Giguere each include a rotary cutting means. In the Giguere brush cutter, the workhead has V-shaped portions on opposite sides of the rotary cutter to channel vegetation to be cut toward the cutter. Denis discloses a machine for harvesting trees and brush wood in which a pair of claws are mounted above the cutting head to grasp small trees to position them for cutting.

C. M. Ripps discloses, in U.S. Pat. No. 3,061,996, granted Nov. 6, 1962, a hydraulic mower having a three-arm boom arrangement with inner and outer vertically oriented arms and an intermediate horizontally oriented arm. U.S. Pat. No. 3,494,389, granted Feb. 10, 1970, to J. L. Thibodeau, discloses electro-hdyraulic apparatus for cutting and loading logs which has jaws for gripping the logs and positioning them to be cut by a ring saw. U.S. Pat. No. 4,281,693, granted Aug. 4, 1981, to D. C. Moulson, discloses a head for tree feller having means for securely gripping the tree before the tree is cut. J. Kurelek discloses, in U.S. Pat. No. 4,446,897, granted May 8, 1984, a hydraulic tree feller with a felling head which has mounted thereon two pairs of grappling arms for clasping a tree just after the tree is cut.

Hydraulic three-arm boom arrangements are disclosed in U.S. Pat. Nos. 3,253,716, granted May 31, 1966, to R. R. Stratton; 4,365,926, granted Dec. 28, 1982, to W. K. Brown; and 4,393,607, granted July 19, 1983, to K. Hirosawa. In the load carrier disclosed by Brown and the excavator disclosed by Hirosawa, the outermost arm pivots back toward a position in which it is between the inmost and the intermediate arms. Stratton discloses a crane mounted in the bed of a truck. The three arms of the articulated boom of the crane have a Z-shaped configuration. The arms fold up into a compact position in which they are parallel to each other and extend into positions in which they form obtuse angles with each other. Stops are provided to limit movement of the arms outwardly from each other. The inner arm of the Stratton crane is pivotably connected to the top of a post that is attached to the bed of the truck and pivots between a position in which it angles downwardly from the top of the post to a position in which it angles upwardly from the top of the post. The crane is described as being capable of picking up loads from the truck or in close proximity to the rear or sides of the truck and of transporting them a considerable distance away from the truck or to heights a considerable distance above the truck.

A hydraulically operated dipper is disclosed in U.S. Pat. No. 2,927,706, granted Mar. 8, 1960, G. W. Mork. The dipper has a two-section boom in which the outer section is connected to the inner section by means of a link arrangement in which a first link is pivotably connected at one end to the inner section and at another end to a lever, the other end of the lever is pivotably attached to the outer section, a hydraulic cylinder attached to the inner section is pivotably attached to an intermediate portion of the link, and the inner section is attached to the outer section at a point spaced from the lever connection which point defines a pivotal axis of the outer section. In the tree felling apparatus disclosed by Kurelek, a similar linkage arrangement connects the feller head to an arm of an articulated boom. The linkage arrangement differs from the arrangement shown by Mork in that the lever is connected to a midportion of the link and the hydraulic cylinder is connected to the outer end of the link.

The above patents and the prior art that is cited and/or discussed therein should be studied for the purpose of putting the present invention into proper perspective relative to the prior art.

DISCLOSURE OF THE INVENTION

The subject of the invention is a brush cutter. According to an aspect of the invention, the cutter comprises a base, a first boom having inner and outer ends, and means for pivotably mounting the inner end of the boom on the base. The boom pivots between a position in which the boom extends generally vertically upwardly from the base and a position in which the boom extends generally horizontally outwardly from the base. A second boom has a first end pivotably attached to the outer end of the first boom, a second end, and opposite front and rear portions extending between the first and second ends. The second boom is pivotable between a position in which it extends outwardly from and is generally parallel to the first boom and a position in which it extends generally downwardly from the first boom and the rear portion is folded back toward and generally adjacent to the first boom. A third boom has a first end pivotably attached to the second end of the second boom, and a second end. The third boom is pivotable between a position in which it extends outwardly from and is generally parallel to the second boom and a position in which it is folded back toward and generally adjacent to the front portion of the second boom. A cutting head is pivotably attached to the second end of the third boom to pivot between a position in which it is generally parallel to the third boom and a position in which it is generally perpendicular to the third boom. The brush cutter also includes actuating means for independently pivoting the first, second, and third booms and the cutting head relative to each other and the base.

A preferred feature of the invention is the inclusion in the cutter of the first and second opposing jaws. The first jaw is mounted on the third boom, and the second jaw is mounted on the cutting head. The second jaw is positioned to move toward and away from the first jaw when the cutting head pivots relative to the third boom to grip and release brush and other debris. Preferably, the first and second jaws each include a plurality of teeth that form a rake for raking brush and other debris, and the jaws are positioned and dimensioned to form an excavating tool.

Another preferred feature of the invention is a cuting head that includes a rotary cutting blade and a shroud surrounding a top portion and three sides of the cutting blade for directing cut brush and other debris that is propelled outwardly by the cutting blade. In the preferred embodiment, the second jaw is attached to and projects rearwardly from the shroud. The provision of the cutting head with the shroud helps to make the direction that debris will go in predictable and, thereby, helps to protect personnel and equipment in the area from injury or damage due to flying debris.

According to another aspect of the invention, the brush cutter comprises the combination of a vehicle, a base carried by the vehicle and mounted to pivot about a vertical axis, and the three booms, cutting head, and actuating means described above. This combination provides a highly versatile brush cutter that may readily be moved to a cutting location and can completely cut a wide area before again being moved. This is very important in swampy and steep terrain.

In the preferred embodiment, the cutting head includes a rotary cutting blade and a motor having a rotating shaft fixed to the blade for rotating the blade. The motor also has a fixed bearing housing surrounding the shaft, bearing means between the housing and the shaft, and a grease seal axially between the bearing means and the blade. A mounting flange has a radial portion fixed to the blade and an axial portion surrounding an adjacent portion of the bearing housing. A dirt seal between the axial portion and the bearing housing protects the grease seal from contact with debris.

In brush cutters constructed according to the invention, the arrangement of the three booms and the cutting head with respect to each other and the manner in which they move with respect to each other maximize the area that can be cut and cleared from a single cutter location and the efficiency with which the cutting operation may be carried out. An area ranging from very close to the base of the cutter to the maximum reach of the three booms may be completely cleared by the cutter without moving the cutter. In addition, the arrangement of the booms and cutter head permits a tree to be trimmed vertically in a clear straight line to completely clear an area, such as a right-of-way for a power line, and clearly define the boundary of the right-of-way. The cutter of the invention is highly versatile, folds up into a convenient configuration for movement from one cutting area to another, and is economical to operate. The cutter of the invention helps to reduce the cost of maintaining areas free of unwanted vegetation by making it possible to complete a particular cutting operation rapidly and efficiently. The amount of time required for moving the cutter from one position to another is minimized so that most of the operating time is available for the actual cutting operation.

These and other features and advantages will become apparent from the detailed description of the best mode for carrying out the invention that follows.

BRIEF DESCRIPTION OF THE DRAWINGS

In the drawings, like element designations refer to like parts throughout, and:

FIG. 4 is a pictorial view of the brush cutter shown in FIGS. 1-3.

FIG. 5 is a pictorial view of the outer end of the third boom and the cutting head shown in FIGS. 1-4.

FIG. 6 is an elevational view of the booms and cutting head of the brush cutter shown in FIGS. 1-5, with the booms in a folded position ready for transport.

FIG. 7 is similar to FIG. 6 except that it shows the booms in a partially extended position.

FIG. 8 is similar to FIG. 7 except that it shows the booms in an extended vertical position.

FIG. 9 is an elevational view of the outer portion of the third boom and the workhead, showing the jaws being used to pick up debris.

FIG. 10 is a schematic sectional view of the connection between the motor shaft and the rotary cutter, with the shaft shown in elevation.

FIG. 11 is a front elevational view of the workhead shown in FIGS. 1-9.

FIG. 12 is a vertical sectional view of the same.

FIG. 13 is a bottom plan view of the same.

BEST MODE FOR CARRYING OUT THE INVENTION

Figure 1:
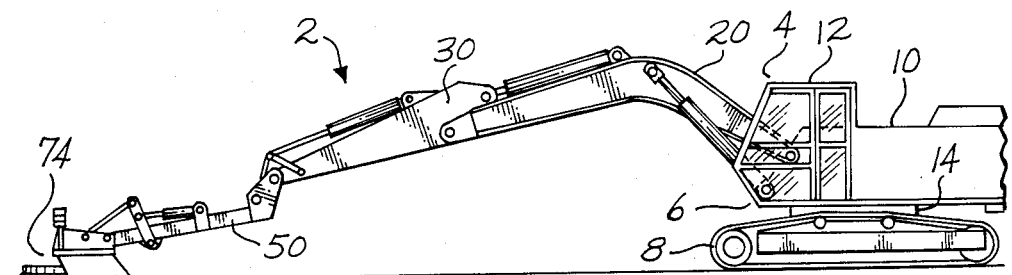
FIG. 1 is an elevational view of the preferred embodiment of the brush cutter, showing the three booms fully extended in a horizontal position.

The drawings show a brush cutter 2 that is constructed in accordance with the invention and that also constitutes the best mode for carrying out the invention currently known to the applicant. In the drawings, the three booms 20,30,50 of the cutter 2 are shown mounted on a tractor type vehicle 6. This is the preferred combination of the brush cutter 2 of the invention since the vehicle 6 is well adapted for carrying the cutter booms 20,30,50 into relatively inaccessible areas and provides a convenient mounting platform for the booms 20,30,50. However, it is of course to be understood that, in the cutter of the invention, the booms may also be mounted on other types of vehicles or devices without departing from the spirit and scope of the invention.

In the preferred combination of the invention, the brush cutter 2 includes a backhoe 4 of a known type. The backhoe 4 includes a carrier vehicle 6 which has endless belt-type treads 8 for carrying the backhoe 4 over all types of terrain. A base 10 is mounted on the treads 8 by means of a turntable 14. A cab 12 for the operator is attached to the base 10. The turntable 14 is pivotable about a vertical axis in a known manner to permit the base 10 and any devices mounted thereon to be pivoted about such axis. The backhoe 4 is commercially available equipped with two booms 20,30 and a hydraulic system for operating the booms 20,30. In the combination of the invention, the hydraulic system is modified to operate the additional elements of the combination.

Figure 2:
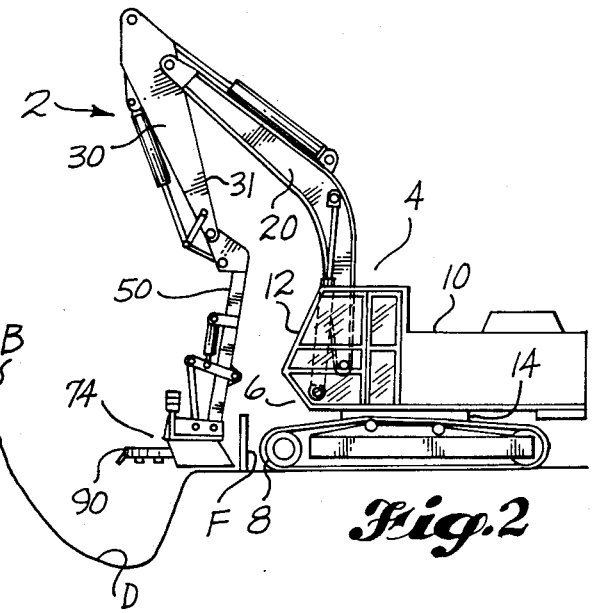
FIG. 2 is an elevational view of the brush cutter shown in FIG. 1 with the booms in a position to cut brush near the vehicle.
Figure 3:
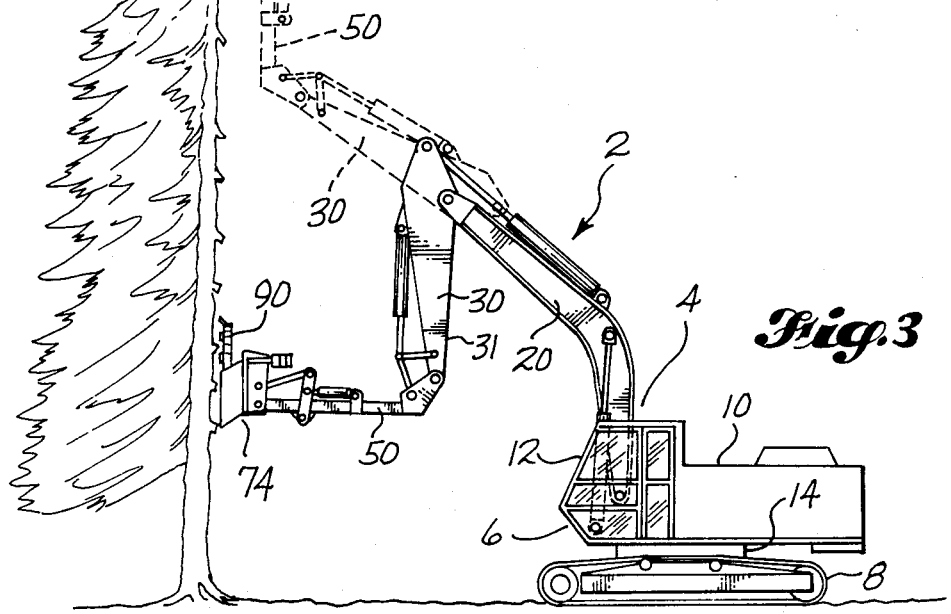
FIG. 3 is an elevational view of the brush cutter shown in FIGS. 1 and 2 in position to trim the branches of a tree along a vertical line.

The first boom 20 has a known bent configuration that ensures that the second boom 30 clears the vehicle 6 when the first boom 20 is in a vertical position. The first boom 20 has an inner end that is pivotably attached to the base 10 of the vehicle 6 by a pivot pin 21. The backhoe 4 has a hydraulic system for pivoting the boom 20 between a position in which it extends generally vertically upwardly from the base 10, as shown in FIGS. 2, 3, and 8, and a position in which it extends generally horizontally outwardly from the base 10, as shown in FIG. 1. A pair of hydraulic cylinders 16 are pivotably attached to the base 10 and the boom 20 to pivot the boom 20 between its vertical and horizontal positions. The closed end of each cylinder 16 is attached to mounting ears 18 carried by the base 10 at a location below and forward of the pivot pin 21. Each cylinder 16 has a piston 22 that extends therefrom and is pivotably attached to the boom 20 at an attachment point 24 located near the bend in the boom 20. The two pistons 22 are attached to opposite sides of the boom 20. A pair of mounting lugs 28 are secured to the rear surface of the boom 20, outwardly of the pivotal piston attachments 24, for mounting a cylinder 26.

The outer end of the first boom 20 is pivotably attached to the second boom 30 at a pivot location 36 spaced from the inner end of the second boom 30. The cylinder 26 is also attached to the boom 30 to pivot it about pivot point 36. The cylinder 26 has a piston 32 which extends therefrom and is pivotably attached to mounting lugs 34 carried by the inner end of the second boom 30.

The cylinder 26 is connected to the hydraulic system of the vehicle 6 and operates to pivot the second boom 30 relative to the first boom 20 about pivot point 36. The second boom 30 has a rear surface 31 that faces rearwardly toward the vehicle 6 when the second boom 30 is in a generally vertical position extending downwardly from the first boom 20. The opposite front surface 49 of the second boom 30 faces forwardly when the boom 30 is in this position. The second boom 30 is pivoted by the cylinder 26 between a position in which it extends outwardly from and is generally parallel to the first boom 20, as shown in FIGS. 1 and 8 and in phantom in FIG. 3, and a position in which it extends generally downwardly from the first boom 20, as shown in FIGS. 2-4, 6, and 7. When the second boom 30 moves away from its fully extended generally parallel position toward its folded position, the rear surface 31 folds back toward the first boom 20. FIG. 6 shows the second boom 30 substantially in its fully folded position. The position shown in FIG. 6 may be conveniently used for transporting the brush cutter 2 from one cutting location to another. Preferably, a trailer is provided for supporting the booms 20,30,50 and the work head 74 when they are transported in this position.

A pair of mounting lugs 40 are secured to the front surface 49 of the second boom 30 for pivotably mounting the closd end of a hydraulic cylinder 38. A pixton 42 extends outwardly from the opposite open end of the cylinder 38 and pivotably engages a linkage arrangement carried by the second boom 30. The linkage arrangement includes a first pair of links 44 that are pivotably attached to opposite sides of the boom 30 near its outer end and that extend forwardly and generally perpendicularly therefrom. The forward free ends of the links 44 are connected to each other by a pin 46. The outer end of the piston 42 is pivotably connected to a center portion of this pin 46. A second pair of links 48 provide a pivotal connection between the pin 46 and the third boom 50 of the cutter 2.

The inner end of the third boom 50 has formed thereon a pair of opposing mounting flanges 52. These mounting flanges 52 provides a means for pivotably connecting the third boom 50 and second boom 30 and the third boom 50 and the links 48. The second boom 30 is pivotably attached to the inner end of the flanges 52, that is the end nearest the vehicle 6, at a pivot location 56. The ends of the links 48 opposite the ends attached to the pin 46 are pivotably attached to the mounting flanges 52 at a pivot location 54 positioned forwardly and outwardly of the pivot location 56.

The cylinder 38 carried by the second boom 30 is connected to the hydraulic system of the vehicle 6 and operates to pivot the third boom 50 relative to the second boom 30 about pivot point 56. The third boom 50 pivots between a fully extended position in which it extends outwardly from and is generally parallel to the second boom 30, as shown in FIGS. 1 and 2, and a folded position in which it is folded back toward and generally adjacent to the front surface 49 of the second boom 30. FIGS. 3, 4, 7, and 8 show the third boom 50 in an intermediate position, and FIG. 6 shows boom 50 in its fully folded position.

The third boom 50 carries a pair of mounting lugs 60 that extend outwardly from its surface which is adjacent to the second boom 30 when it is folded back against the second boom 30. The lugs 60 provide mounting means for pivotably mounting the closed end of a cylinder 58 on the boom 50. The cylinder 58 has a piston 62 that extends forwardly therefrom and engages a linking arrangement which is in turn connected to a workhead 74. The cylinder 58 is connected to the hydraulic system of the vehicle 6 and is operable to pivot the workhead 74 relative to the third boom 50.

The linkage arrangement includes a pair of links 64 having lower ends which are pivotably connected to mounting ears 66 carried by the third boom 50 and projecting from its surface opposite the surface from which the cylinder mounting lugs 60 project. The opposite upper ends of the links 64 are connected by a pin 70, and the midportions of the links 64 are connected by a pin 68. The outer free end of the piston 62 pivotably engages the mid connecting pin 68. A lever 72 is pivotably attached to the upper pin 70 at one end and to the cutter head 74 at its other end. The lever 72 is pivotably attached to head 74 at a pivot point 78 located at an upper midportion of the head 74. The outer or forward end of the third boom 50 is pivotably attached to the inner or rear end of the workhead 74 at a pivot location 80. The cylinder 58 operates to move the linkage mechanism to pivot workhead 74 about pivot point 80.

The workhead 74 includes a housing 76, the upper portion 110 of which provides the pivot connections 78,80. A shroud 82 extends downwardly and outwardly from three sides of the housing 76 and forms therewith a casing that is enclosed on the top and three sides and is open on the bottom and the forward side. A rotary cutter 90 is mounted in the casing formed by the housing 76 and the shroud 82, and a portion of the cutter 90 extends forwardly from the casing. The cutter 90 has peripheral cutting teeth 92 for cutting brush and teeth 93 on its upper and lower surfaces for mulching. The cutter 90 is connected by a shaft 96 to a hydraulic motor 94 which rotates the cutter 90 to cut brush and other vegetation. The rotary cutter 90 is mounted generally parallel to the housing 76 and rotates about an axis perpendicular to the housing 76. The cylinder 58 operates to pivot the cutting head 74 between a position in which it and the cutter 90 are generally parallel to the third boom 50, as shown in FIGS. 1, 6, and 8 and in broken lines in FIG. 3, and a position in which it and the cutter 90 are generally perpendicular to the third boom 50, as shown in FIGS. 3 and 4. FIGS. 2, 5, 7, and 9 show the head 74 in an intermediate position.

The preferred embodiment of the brush cutter 2 shown in the drawing also includes a pair of jaws 84,86 that enable the cutter 2 to perform gripping, raking, and digging functions, as well as cutting functions. The rear jaw 86 is mounted on the third boom 50 and extends forwardly and downwardly from the boom 50 between the mounting ears 66. The forward jaw 84 is secured to the shroud 82 and is positioned to move toward and away from the rear jaw 86 when the workhead 74 pivots relative to the third boom 50. Each jaw 84,86 includes a plurality of triangular teeth 88 that mate together when the two jaws 84,86 are brought together. As shown in FIG. 6, the two jaws 84,86 fully engage each other when the work head 74 is in a position in which it is parallel to the third boom 50. The teeth 88 of the jaws 84,86 aid the jaws in their gripping function for picking up and moving brush and other debris, as shown in FIG. 9. The teeth 88 also facilitate the use of the jaws 84,86, especially forward jaw 84, as a rake and facilitate the use of the jaws 84,86 as a digging or excavating tool. The jaws 84,86 are made from a metal of sufficient strength to accomplish a digging operation, and the jaws 84,86 are positioned and dimensioned to form an excavating tool.

Referring to FIGS. 10 and 11, a bearing housing 98 surrounds the shaft 96 of the motor 94 and extends from the chain coupling 97 of the motor 94 into the housing 76 of the workhead 74. Bearing means 100 of a suitable type is positioned between the fixed bearing housing 98 and the rotatable shaft 96. A grease seal 102 is positioned at the inner end of the bearing housing 98 axially between the bearing means 100 and the rotary cutting blade 90. The end of the shaft 96 is fixed to the rotary cutting blade 90. A mounting flange having an axial portion 104 and a radial portion 106 extends between the bearing housing 98 and the rotary cutter 90 and rotates therewith. The axial portion 104 surround an adjacent portion of the bearing housing 98, and the radial portion 106 is fixed to the cutting blade 90. A dirt seal 108 is positioned between the bearing housing 98 and the axial portion 104 of the flange 104,106 to protect the inner grease seal 102 from contact with debris.

Referring to FIGS. 11-13, the housing 76 of the workhead 74 includes an upper portion formed by a pair of opposing vertical flanges 110. These flanges 110 provide mounting locations for the pivotal connections 78,80 between the workhead 74 and the lever 72 and boom 50, respectively. Horizontal portions 112,114 extend laterally outwardly from the vertical flanges 110 and decrease in width from the front to the rear of the head 74. As can be seen in FIG. 13, the forward edge of one of the horizontal portions 112 extends perpendicularly to the axis of the workhead 74, and the forward edge of the other horizontal portion 114 is angled rearwardly. The rotary cutter 90 rotates toward the angled horizontal portion 114, and the angling of the portion 114 helps to ensure a smooth biting cut of the cutter 90 into wood and brush and to prevent binding of the vegetation between the cutter 90 and the housing 76. A triangular brace 116 extends upwardly and laterally inwardly from the forward edge of each horizontal portion 112,114 to the top of the corresponding vertical flange 110. The braces 116 may be provided in the form of solid triangular pieces that extend along the vertical length of the flanges 110, as shown in FIG. 11. Alternatively, the braces may be provided in the form of bars 116' that engage the top of the vertical flanges 110 but do not extend downwardly therealong, as shown in Fig. 9. The shroud 82 is attached to the housing 76 around the edges of the horizontal portions 112,114. The shroud 82 has a short vertical portion 118 that is welded to the edges of the horizontal portions 112,114 to provide strength. From portion 118, the shroud 82 curves and angles outwardly from the horizontal portions 112,114 of the housing 76, as can be seen in FIGS. 5, 11, and 12. The angling of the shroud 82 provides it with additional strength and helps to direct debris from the rotary cutter 90. The forward edges of the shroud 82 are rounded to prevent it from snagging on vegetation.

The operation of the brush cutter 2 is as follows.

The cutter 2 is transported to the area in which the cutting and clearing and/or digging is to be carried out. When the cutter 2 is to be transported over public highways, it is preferably loaded onto a trailer which is pulled by a truck or other suitable vehicle. Upon arrival at the work location, the cutter is unloaded from the trailer and positioned under its own power to begin operation. The hydraulic system of the backhoe vehicle 6 is operated to independently pivot the first, second, and third booms 20,30,50 and the workhead 74 relative to each other and to the base 10 of the vehicle 6 and to pivot the turntable 14. The independent operation of these elements enables the workhead 74 to be positioned at any horizontal and vertical location within a wide area around the vehicle 6. FIG. 1 illustrates each of the three booms 20,30,50 in its fully outstretched position, with the three booms 20,30,50 and the workhead 74 generally parallel to each other. The position of the booms 20,30,50 shown in FIG. 1 provides the maximum horizontal reach of the brush cutter 2 which is approximately 42 feet.

FIG. 2 illustrates the booms 20,30,50 moved relative to each other to position the workhead 74 close to the vehicle 6. In FIG. 2, the cutter 2 is shown positioned on a road bounded by a fence F. Beyond the fence is a ditch D and a bank B. The booms 20,30,50 may be operated to cut growth on the flat area between the ditch D and the fence F, in the ditch D, and up the bank B. The workhead 74 will follow the contour of the ditch D to completely cut all the vegetation in the ditch D. This ability to clear the ditch D and area adjacent to the fence F from a position just on the other side of the fence F makes it possible to accomplish a clearing operation without blocking the entire roadway.

FIG. 3 illustrates the brush cutter 2 trimming the branches from one side of a tree. The three booms 20,30,50 and the workhead 74 are moved independently relative to each other to cause the workhead 74 to move in a vertical line up the tree to trim the branches. The position of the booms 20,30,50 and the workhead 74 at the lower end of the vertical movement is shown in solid lines, and the position of the booms 20,30,50 and the workhead near the top end of the vertical movement is shown in broken lines. The maximum vertical reach of the booms 20,30,50 is about 40 feet.

The brush cutter 2 may be used for trimming trees, cutting and clearing brush along the ground, gathering the brush and other debris, raking, and digging, such as to form or enlarge a drainage ditch. During a cutting operation, the hydraulic system of the vehicle 6 powers the motor 94 to rotate the cutter 90. The shroud 82 around the cutter 90 functions to prevent debris from the cutter 90 from flying off in unpredictable directions.

The workhead 74 is pivoted relative to the third boom 50 in order to move the jaws 84,86 away from and toward each other during gathering and digging operations. The workhead 74 is pivoted into a position in which it is generally perpendicular to the arm 50, as shown in solid lines in FIG. 3 and in FIG. 7, to open the jaws 84,86 and grasp debris or dig the jaws into the ground for a digging operation. Then the workhead 74 is pivoted back toward its parallel position, shown in FIG. 6, to grasp the debris or a quantity of earth. In a debris moving operation, the jaws generally need not be fully closed since a firm hold of the debris may be obtained in the position shown in Fig. 9. In an earth moving operation, the jaws would generally be fully closed into the position shown in FIG. 6. Once the jaws have been closed around the debris or earth, the booms 20,30,50 and the turntable 14 may be operated to move the workhead 74 to a different location where it is desired to deposit the debris or earth. For example, in a swampy area, logs that have been cut may be laid in front of the cutter 2 to provide a roadway along which the cutter can progress into the area.

In addition to functioning to gather debris and dig in the ground, the jaw 84 on the workhead 74 may be used as a rake to rake brush or the ground to help in a clearing operation. When the jaw 84 is to be used as a rake, preferably the workhead 74 is moved all the way into its perpendicular position. The jaws may also be used to firmly grip the top of a tree which is to be cut. The tree is then cut with, for example, a chain saw, and the booms 20,30,50 are operated to move the cut tree. The gripping of the tree prevents it from falling on nearby buildings and the like.

The manner in which the three booms 20,30,50 and the workhead 74 move relative to each other and the multifunctioning capability of the workhead 74 make it possible to complete an entire clearing and digging operation over a wide area without having to move the backhoe vehicle 6. The multifunctioning of the workhead 74 in combination with the lack of a necessity for moving the vehicle 6 makes it possible to accomplish a particular operation in a minimum amount of time without the need for any equipment other than the brush cutter 2 and without any need for changing or substituting workheads.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A brush cutter comprising:
    a base;
    a first boom having inner and outer ends;
    means for pivotably mounting said inner end on the base to pivot between a position in which the boom extends generally vertically upwardly from the base and a position in which the boom extends generally horizontally outwardly from the base;
    a second boom having a first end pivotably attached to said outer end of the first boom, a second end, and opposite front and rear portions extending between said first and second ends; said second boom being pivotable between a position in which it extends outwardly from and is generally parallel to the first boom and a position in which it extends generally downwardly from the first boom and said rear portion is folded back toward and generally adjacent to the first boom;
    a third boom having a first end pivotably attached to said second end of the second boom, and a second end; said third boom being pivotable between a position in which it extends outwardly from and is generally parallel to the second boom and a position in which it is folded back toward and generally adjacent to said front portion of the second boom;
    a cutting head pivotably attached to said second end of the third boom to pivot between a position in which it is generally parallel to the third boom and a position in which it is generally perpendicular to the third boom; and
    actuating means for independently pivoting the first, second, and third booms and the cutting head relative to each other and to the base.

2. A brush cutter as described in claim 1, in which the cutting head includes a rotary cutting blade, and a shroud surrounding a top portion and three sides of the cutting blade for directing cut brush and other debris that is propelled outwardly by the cutting blade.

3. A brush cutter as described in claim 1, in which the cutting head includes a rotary cuting blade; a motor having a rotary shaft fixed to the blade for rotating the blade, a fixed bearing housing surrounding the shaft, bearing means between the housing and the shaft, and a grease seal axially between the bearing means and the blade; a mounting flange having a radial portion fixed to the blade and an axial portion surrounding an adjacent portion of the bearing housing; and a dirt seal between said axial portion and the bearing housing to protect the grease seal from contact with debris.

4. A brush cutter comprising:
    a base;
    a first boom having inner and outer ends;
    means for pivotably mounting said inner end on the base to pivot between a position in which the boom extends
    generally vertically upwardly from the base and a position in which the boom extends generally horizontally outwardly from the base;

a second boom having a first end pivotably attached to said outer end of the first boom, a second end, and opposite front and rear portions extending between said first and second ends; said second boom being pivotable between a position in which it extends outwardly from and is generally parallel to the first boom and a position in which it extends generally downwardly from the first boom and said rear portions is folded back toward and generally adjacent to the first boom;

a third boom having a first end pivotably attached to said second end of the second boom, and a second end; said third boom being pivotable between a position in which it extends outwardly from and is generally parallel to the second boom and a position in which it is folded back toward and generally adjacent to said front portion of the second boom;

a cutting head pivotably attached to said second end of the third boom to pivot between a position in which it is generally parallel to the third boom and a position in which it is generally perpendicular to the third boom;

actuating means for independently pivoting the first, second, and third booms and the cutting head relative to each other and to the base; and first and second opposing jaws, said first jaw being mounted on the third boom, and a second jaw being mounted on the cutting head and positioned to move toward and away from said first jaw when the cutting head pivots relative to the third boom to grip and release brush and other debris.

5. A brush cutter as described in claim 4, in which the first jaw and the second jaw each include a plurality of teeth that form a rake for raking brush and other debris, and the jaws are positioned and dimensioned to form an excavating tool.

6. A brush cutter as described in claim 2, in which the cutting head includes a rotary cutting blade, and a shroud surrounding a top portion and three sides of the cutting blade for directing cut brush and other debris that is propelled outwardly by the cutting blade; said second jaw being attached to and projecting rearwardly from said shroud.

7. A brush cutter as described in claim 5, in which the cutting head includes a rotary cutting blade, and a shroud surrounding a top portion and three sides of the cutting blade for directing cut brush and other debris that is propelled outwardly by the cutting blade; said second jaw being attached to and projecting rearwardly from said shroud.

8. A brush cutter comprising the combination of:
a vehicle;
a base carried by the vehicle and mounted to pivot about a vertical axis;
a first boom having inner and outer ends;
means for pivotably mounting said inner end on the base to pivot between a position in which the boom extends generally vertically upwardly from the base and a position in which the boom extends generally horizontally outwardly from the base;
a second boom having a first end pivotably attached to said outer end of the first boom, a second end, and opposite front and rear portions extending between said first and second ends; said second boom being pivotable between a position in which it extends outwardly from and is generally parallel to the first boom and a position in which it extends generally downwardly from the first boom and said rear portion is folded back toward and generally adjacent to the first boom;

a third boom having a first end pivotably attached to said second end of the second boom, and a second end; said third boom being pivotable between a position in which it extends outwardly from and is generally parallel to the second boom and a position in which it is folded back toward and generally adjacent to said front portion of the second boom;

a cutting head pivotably attached to said second end of the third boom to pivot between a position in which it is generally parallel to the third boom and a position in which it is generally perpendicular to the third boom; and actuating means for independently pivoting the first, second, and third booms and the cutting head relative to each other and to the base.

9. A brush cutter as described in claim 8, in which the cutting head includes a rotary cutting blade, and a shroud surrounding a top portion and three sides of the cutting blade for directing cut brush and other debris that is propelled outwardly by the cutting blade.

10. A brush cutter as described in claim 8, in which the cutting head includes a rotary cutting blade; a motor having a rotating shaft fixed to the blade for rotating the blade, a fixed bearing housing surrounding the shaft, bearing means between the housing and the shaft, and a grease seal axially between the bearing means and the blade; a mounting flange having a radial portion fixed to the blade and an axial portion surrounding an adjacent portion of the bearing housing; and a dirt seal between said axial portion and the bearing housing to protect the grease seal from contact with debris.

11. A brush cutter comprising the combination of:
a vehicle;
a base carried by the vehicle and mounted to pivot about a vertical axis;
a first boom having inner and outer ends; means for pivotably mounting said inner end on the base to pivot between a position in which the boom extends generally vertically upwardly from the base and a position in which the boom extends generally horizontally outwardly from the base;
a second boom having a first end pivotably attached to said outer end of the first boom, a second end, and opposite front and rear portions extending between said first and second ends; said second boom being pivotable between a position in which it extends outwardly from and is generally parallel to the first boom and a position in which it extends generally downwardly from the first boom and said rear portion is folded back toward and generally adjacent to the first boom;
a third boom having a first end pivotably attached to said second end of the second boom, and a second end; said third boom being pivotable between a position in which it extends outwardly from and is generally parallel to the second boom and a position in which it is folded back toward and generally adjacent to said front portion of the second boom;
a cutting head pivotably attached to said second end of the third boom to pivot between a position in which it is generally parallel to the third boom and a position in which it is generally perpendicular to the third boom;
actuating means for independently pivoting the first, second, and third booms and the cutting head relative to each other and to the base; and first and second opposing jaws, said first jaw being mounted on the third boom, and said second jaw being mounted on the cutting head and positioned to move toward and away from said first jaw when the cutting head pivots relative to the third boom to grip and release brush and other debris.

12. A brush cutter as described in claim 11, in which the first jaw and the second jaw each include a plurality of teeth that form a rake for raking brush and other debris, and the jaws are positioned are dimensioned to form an excavating tool.

13. A brush cutter as described in claim 11, in which the cutting head includes a rotary cutting blade, and a shroud surrounding a top portion and three sides of the cutting blade for directing cut brush and other debris that is propelled outwardy by the cutting blade; said second jaw being attached to and projecting rearwardly from said shroud.

14. A brush cutter as described in claim 12, in which the cutting head includes a rotary cutting blade, and a shroud surrounding a top portion and three sides of the cutting blade for directing cut brush and other debris that is propelled outwardly by the cutting blade; said second jaw being attached to and projecting rearwardly from said shroud.

15. A brush cutter comprising:
a base;
a first boom having inner and outer ends;
means for pivotably mounting said inner end on the base;
a second boom having a first end pivotably attached to said outer end of the first boom, and a second end;
a third boom having a first end pivotably attached to said second end of the second boom, and a second end;
a cutting head pivotably attached to said second end of the third boom;
actuating means for independently pivoting the first, second, and third booms and the cutting head relative to each other and to the base; and
first and second opposing jaws, said first jaw being mounted on the third boom, and said second jaw being mounted on the cutting head and positioned to move toward and away from said first jaw when the cutting head pivots relative to the third boom to grip and release brush and other debris.

16. A brush cutter as described in claim 15, in which the first jaw and the second jaw each include a plurality of teeth that form a rake for raking brush and other debris, and the jaws are positioned and dimensioned to form an excavating tool.

17. A brush cutter as described in claim 15, in which the cutting head includes a rotary cutting blade, and a shroud surrounding a top portion and three sides of the cutting blade for directing cut brush and other debris that is propelled outwardly by the cutting blade; said second jaw being attached to and projecting rearwardly from said shroud.

18. A brush cutter as described in claim 15, in which the cutting head includes a rotary cutting blade; a motor having a rotating shaft fixed to the blade for rotating the blade, a fixed bearing housing surrounding the shaft, bearing means between the housing and the shaft, and a grease seal axially between the bearing means and the blade; a mounting flange having a radial portion fixed to the blade and an axial portion surrounding an adjacent portion of the bearing housing; and a dirt seal between said axial portion and the bearing housing to protect the grease seal from contact with debris.

* * * * *

UNITED STATES PATENT AND TRADEMARK OFFICE
CERTIFICATE OF CORRECTION

PATENT NO. : 4,769,977
DATED : September 13, 1988
INVENTOR(S) : David E. Milbourn Page 1 of 2

It is certified that error appears in the above-identified patent and that said Letters Patent are hereby corrected as shown below:

Cover Page, in the section entitled, "References Cited - U.S. PATENT DOCUMENTS", the eighth reference "Tucck" should be -- Tucek --.

Column 1, line 66, "electro-hdyraulic" should be -- electro-hydraulic --.

Column 2, line 2, after "for", insert -- a --.

Column 6, line 10, "closd" should be -- closed --; "pixton" should be -- piston --.

Column 6, line 25, "provides" should be -- provide --.

Column 7, line 65, "surround" should be -- surrounds --.

Column 8, line 36, "shround" should be -- shroud --.

Column 10, 3rd line of claim 3, "rotary" should be -- rotating --.

Claim 4, column 11, line 9, "portions" should be -- portion --.

Claim 4, column 11, line 27, "a" should be -- said --.

Claim 6, column 11, line 37, "claim 2", should be -- claim 4 --.

UNITED STATES PATENT AND TRADEMARK OFFICE
CERTIFICATE OF CORRECTION

PATENT NO. : 4,769,977
DATED : September 13, 1988
INVENTOR(S) : David E. Milbourn It is certified that error appears in the above-identified patent and that said Letters Patent are hereby corrected as shown below:

Column 13, 4th line of claim 12, "are", second occurrence, should be -- and --.

Column 13, 5th line of claim 13, "outwardy" should be -- outwardly --.

Signed and Sealed this

Twenty-fifth Day of April, 1989

Attest:

DONALD J. QUIGG

*Attesting Officer*         *Commissioner of Patents and Trademarks*